United States Patent [19]

Bybel et al.

[11] 4,076,617
[45] Feb. 28, 1978

[54] SONIC CAVITATION AND OZONATION OF WASTE MATERIAL

[75] Inventors: David Bybel, N. Bellmore; Richard F. Furey, Brentwood; Donald P. Stahl, N. Bellmore, all of N.Y.

[73] Assignee: TII Corporation, Lindenhurst, N.Y.

[21] Appl. No.: 760,005

[22] Filed: Jan. 17, 1977

Related U.S. Application Data

[63] Continuation of Ser. No. 575,505, May 8, 1975, abandoned, which is a continuation of Ser. No. 470,452, May 16, 1974, abandoned, which is a continuation of Ser. No. 384,242, Jul. 31, 1973, abandoned, which is a continuation of Ser. No. 136,404, Apr. 22, 1971, abandoned.

[51] Int. Cl.$^2$ .................. C02B 1/78; C02B 1/38; C02B 3/08
[52] U.S. Cl. .................. 210/19; 210/63 Z; 210/64; 21/54 A; 21/102 A; 261/81; 261/123; 261/124; 261/DIG. 42; 261/DIG. 48
[58] Field of Search .............. 210/19, 60, 61, 63 Z, 210/64, 150, 151, 188, 192, 194, 195 R, 199, 201, 202, 205, 218, 221 P, 252, 259, 294, 320, 519; 21/54 A, 54 R, 58, 102 A; 259/DIG. 43, DIG. 44; 261/81, 121 R, 123, 124, DIG. 42, DIG. 48

[56] References Cited

U.S. PATENT DOCUMENTS

| | | | |
|---|---|---|---|
| 996,560 | 6/1911 | Bradley | 210/192 |
| 1,047,534 | 12/1912 | Joseph | 210/188 |
| 2,050,171 | 8/1936 | Walt | 210/63 |
| 2,417,722 | 3/1947 | Wolff | 210/19 |
| 2,468,865 | 5/1949 | Compebasso | 210/63 |
| 2,717,874 | 9/1955 | Verain | 210/19 |
| 2,949,910 | 8/1960 | Brown et al. | 340/10 |
| 3,113,761 | 11/1963 | Platzman | 316/8.1 |
| 3,264,213 | 8/1966 | Pav | 261/DIG. 48 |
| 3,477,947 | 11/1969 | Kappe | 210/3 |
| 3,479,281 | 11/1969 | Kikindai | 210/44 |
| 3,549,528 | 12/1970 | Armstrong | 210/60 |
| 3,672,823 | 6/1972 | Boucher | 21/54 A |
| 3,686,115 | 8/1972 | Farman | 210/19 |
| 3,708,263 | 1/1973 | Boucher | 21/54 R |

FOREIGN PATENT DOCUMENTS

| | | | |
|---|---|---|---|
| 4,513,312 | 5/1970 | Japan | 259/DIG. 43 |

OTHER PUBLICATIONS

The Journal of The Acoustical Society of America, vol. 25, No. 4, "Sonochemistry, The Production of Chemical Changes with Sound Waves", Jul., 1953, pp. 651-657, Weissler.

Flosdoe, Sonic Activation in Chemical Systems: Oxidation at Audible Frequencies, Jul., 1936, Journal of American Chemical Society, pp. 1069-1076.

Weissler, American Institute for Chemical Engineers Ultrasonic-2 Symposium, vol. 47, (1951), Physio Chemical Effects of Ultra-Sonics, pp. 22-27.

Expolsion by Influence, pp. 82-87.

Water Pollution Control Research Series, Feasibility Studies of Applications of Catalytic Oxidation in Waste Waster, EPA, Nov., 1971, pp. 25-31.

*Primary Examiner*—Wilbur L. Bascomb, Jr.
*Assistant Examiner*—Ernest G. Therkorn
*Attorney, Agent, or Firm*—Oldham & Oldham Co.

[57] ABSTRACT

Waste such as sewage or industrial effluent is emulsified by cavitation with acoustical energy and the emulsion is then ozonated to provide a purified product.

18 Claims, 9 Drawing Figures

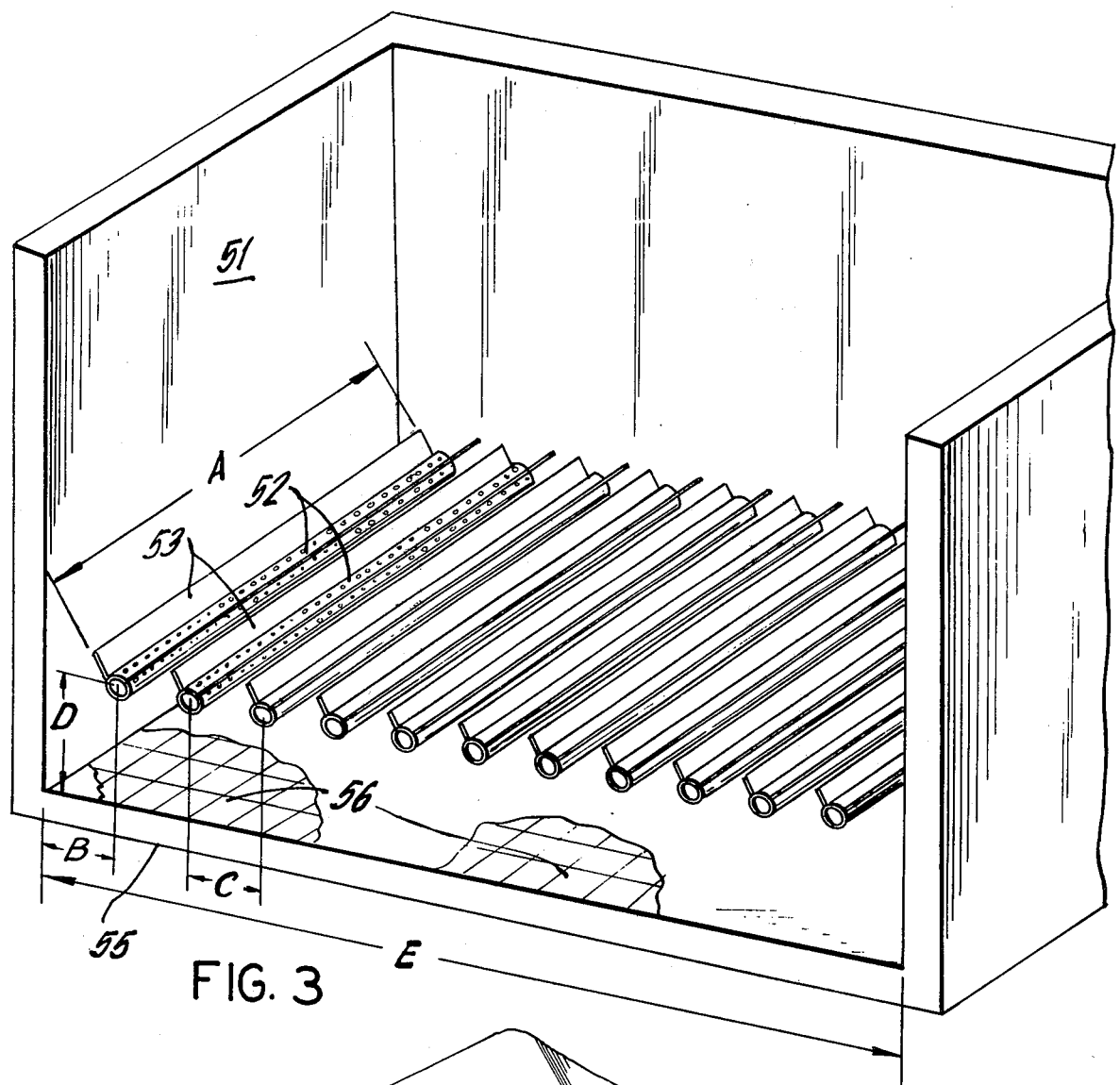

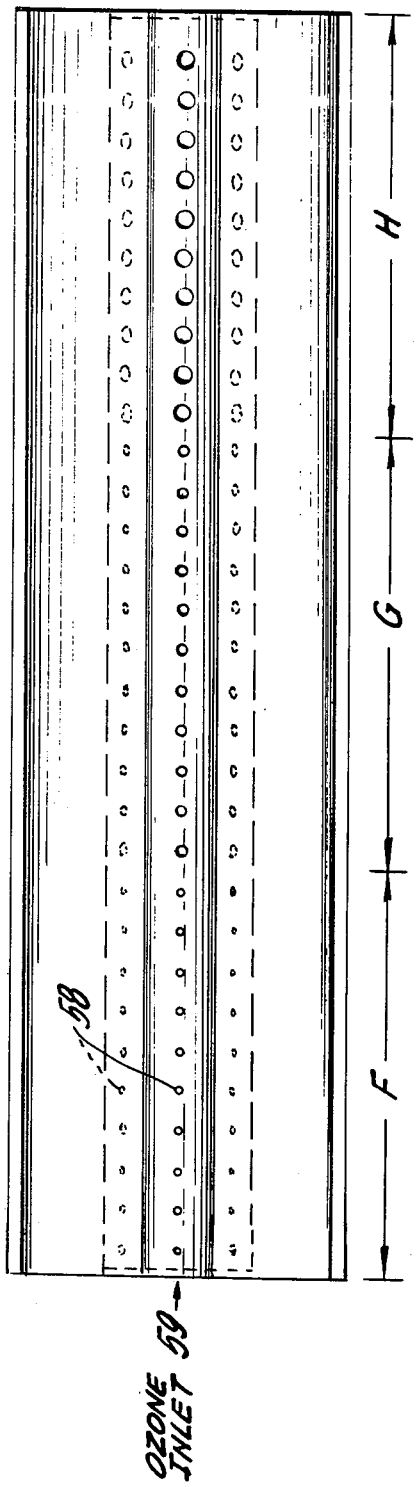
FIG.5
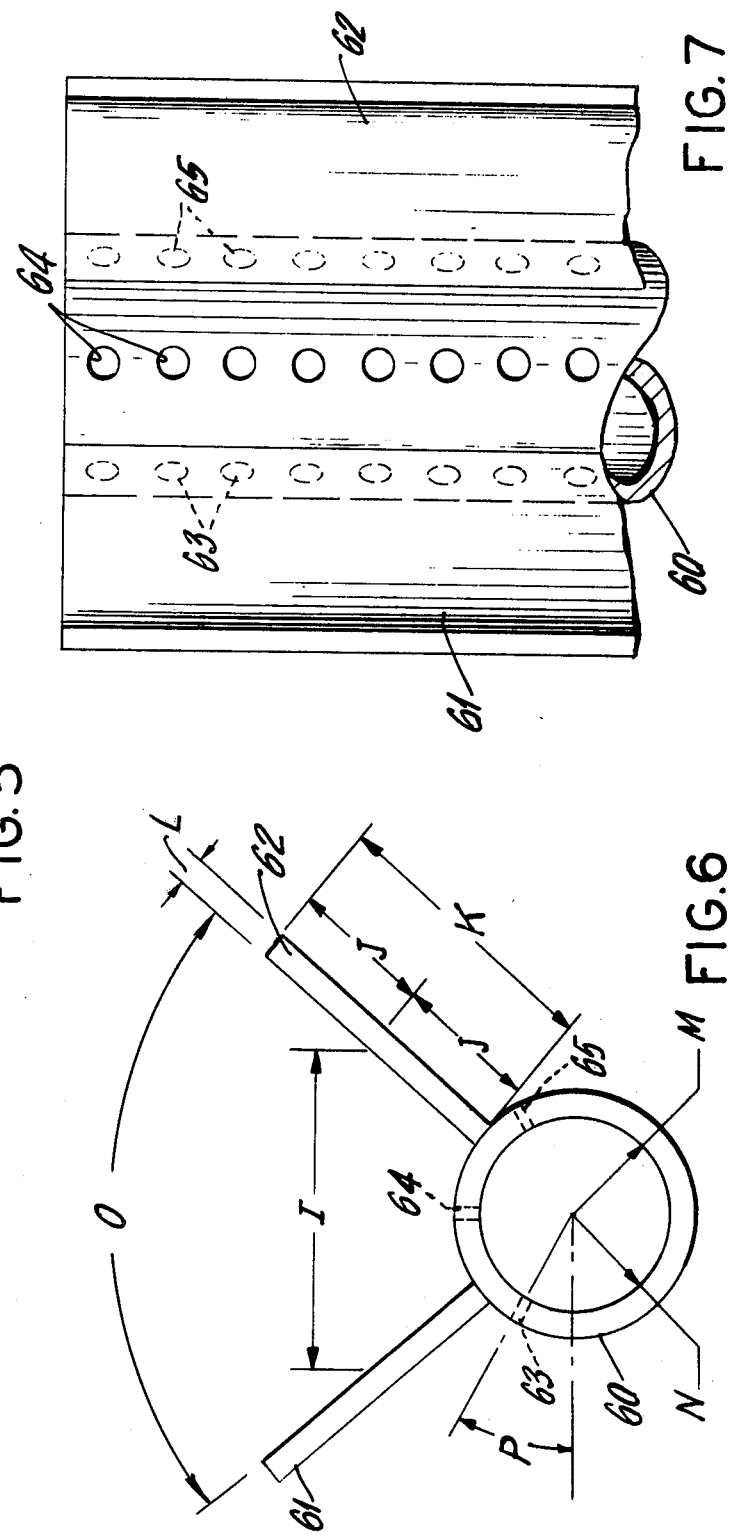
FIG.7
FIG.6

SONIC CAVITATION AND OZONATION OF WASTE MATERIAL

This is a continuation of U.S. Application Ser. No. 575,505 filed May 8, 1975, which is a continuation of U.S. Ser. No. 470,452 filed May 16, 1974, which in turn is a continuation of U.S. Ser. No. 384,242 filed July 31, 1973, which in turn is a continuation of U.S. Ser. No. 136,404 filed Apr. 22, 1971, all now abandoned.

BACKGROUND OF THE INVENTION

The present invention lies in the field of waste treatment. Waste such as municipal sewage or industrial effluent contains many inorganic, organic, and harmful microbiological materials, most of which are only partially degraded by conventional treatments. Chemical oxidation has been suggested for use to convert such materials to removable and harmless oxides but oxidation processes heretofore utilized have been inefficient and have only been capable of oxidizing a small portion of the contaminants normally found in domestic or industrial waste.

Thus, oxidants such as potassium permanganate ($KMnO_4$) and chlorine ($Cl_2$) have been used in many localities to disinfect or to improve the taste and odor qualities of municipal drinking water. These chemicals are not practical for waste treatment, however, because they lack sufficient oxidizing power to degrade many waste constituents and because they leave residual permanganate and chlorine, as the case may be, which must be removed before the treated water can be re-used or returned to the natural environment.

Ozone has also been used in the past to treat contaminated articles or water (U.S. Pat. Nos. 3,445,001, 3,549,528, 2,812,861). Unlike the materials just mentioned, ozone is an extremely powerful oxidant, yet it does not leave a harmful residue. As is well-known, the ozone molecule ($O_3$) is unstable and decomposes to oxygen ($O_2$) over a relatively short period of time. Thus, ozone does have the potential oxidizing power for waste treatment and its residue (oxygen) is beneficial rather than harmful. However, ozone has not heretofore been used for bulk waste treatment because means have not been available wherein ozone could be made to effectively react with the solid constituents of waste and, in any event, the cost of the necessary quantity of ozone required for bulk waste treatment has been prohibitive.

Another serious problem faced in the waste treatment art has been the inability to handle the solid constituents normally found in waste water. Waste effluent such as raw or secondary sewage normally contains a substantial quantity of solids which are difficult to handle physically and are difficult to oxidize.

Conventional mechanical means for breaking down solids in waste solutions often are unsatisfactory or fail entirely due to the large mass of the material being treated and/or the nature of these solids. A gummy or sticky residue can be the result of such mechanical treatment. For this reason, the art has, on occasion, suggested the use of sonic energy in the treatment of waste materials for purposes such as removing solids from filtering screens and/or precipitating solid particles (U.S. Pat. No. 3,489,679), breaking certain kinds of emulsions (U.S. Pat. No. 3,200,567), mixing, solubilizing, or causing the reaction of gases (U.S. Pat. Nos. 3,549,528, 2,717,874), or killing microorganisms (U.S. Pat. No. 3,366,654). Mechanical oscillations have also been suggested for stirring and/or promoting aeration or settling of waste materials (U.S. Pat. Nos. 3,264,213 and 2,770,593).

Additional background which may be of interest may be found in the following: U.S. Pat. Nos. 3,123,043; 1,195,067; 2,958,655; 2,771,416; 3,382,980; 2,138,349; 3,068,172; 2,864,502; 3,421,999; 2,417,722; 3,481,868; 2,874,316; 3,546,114; 3,320,161; 2,660,559; 3,153,530; 3,448,045.

Other References

TREATMENT WITH OZONE — D. C. O'Donovan — Journal Americal Water Works Association, Vol. 57, No. 9, 1965.
DISINFECTION OF DRINKING WATER WITH OZONE — V. A. Hann, Journal American Water Works Association, Vol. 48, No. 10, 1956.
THE ADVANCED WASTE TREATMENT RESEARCH PROGRAM — 1962-1964, U.S. Department of Health, Education and Welfare, AWTR-14, April, 1965.
DEVELOPMENT OF A NEW TYPE OF RAPID SAND FILTER — R. E. Hebert, Journal of the Sanitary Engineering Division, proceedings of The American Society of Civil Engineers, Vol. 92, No. SA1, 1966.
A NEW METHOD OF TREATMENT FOR SURFACE WATER SUPPLIES — E. W. J. Diaper — presented at the Fall meeting of the New York Section, AWWA, 1969.
ACTION OF OZONE ON TASTES AND ODORS AND COLIFORM ORGANISMS — Marcus P. Powel et al. — Journal of American Water Works Assoc., December 1952.
THE OZONATION OF TURRET AND OTHER SCOTTISH WATERS — R. M. Campbell and M. B. Pescod — Journal of Institute of Water Engineers, 19:2:101-125, 1965.
USE OF OZONE IN THE RECLAMATION OF WATER FROM SEWAGE EFFLUENT — P. L. Boucher et al. — paper presented at a meeting of The Institution of Public Health Engineers, London, December, 1967.
Chemical Engineering, March, 1958 — pp. 63, 64.
PUT OZONE TO WORK TREATING PLANT WASTE WATER — Plant Engineering — November, 1966.
OZONE COUNTERS WASTE CYANIDE'S LETHAL PUNCH — Chemical Engineering, Mar. 24, 1958.
THE OZONATION OF CYANIDE WASTES — Richard G. Tyler, Purdue University, 1951.
OZONE IN AIR POLLUTION ABATEMENT — W. E. Cromwell, I/EC Industrial Wastes, Workbook Feature, June, 1959.
OZONATION AT WHITING: 26 Years Later — James F. Bartuska — Public Works, August, 1967.
OZONE IN WATER TREATMENT AND WASTE WATER RENOVATION — D. Thirumuthi — W. & S. W. Reference Number — 1968.

SUMMARY OF THE INVENTION

In view of the need and the problems in the art as aforesaid, the present invention provides a process and apparatus for waste treatment which, in essence, involves imparting acoustic energy to the waste material sufficient to cause cavitation and emulsification of the waste material followed by ozonation of the emulsion thus obtained. Preferred embodiments of the invention include certain means for performing the cavitation and emulsification, certain means for performing the ozonation, and certain means for combining these two steps.

By use of the process and/or apparatus of the invention, waste materials, including solids — containing, highly contaminated materials, can be treated to form a product such as potable water.

BRIEF DESCRIPTION OF THE DRAWINGS

Various embodiments of the present process and apparatus are illustrated in the appended drawings:

FIG. 1 also shows preferred embodiments wherein residual ozone and oxygen emitting from the ozone contact chamber or zone 8 is recycled 12 via ozone stabilizer 13 which is shown in FIGS. 8 and 9 and is discussed in detail hereinafter. FIG. 1 shows another preferred embodiment wherein the ozonated solution 23 is passed into a venting chamber 24, preferably a free-fall spill chamber, so that gaseous oxide products of the ozonation are vented to the atmosphere 25.

FIG. 3 is a schematic diagram illustrating a preferred arrangement for placement of ozone diffusers 53 and transducers 56 within a combination acoustic treatment chamber and ozone contact chamber 51. Dimensions A, B, C, D and E are preferably proportioned to create a resonant circuit which provides highly efficient utilization of acoustic energy.

FIG. 4 is a drawing of a preferred tube-type diffuser 57 having fins 58, 59 thereon and which is useful in the apparatus of FIGS. 2 and 3.

FIG. 5 is a top view of the diffuser of FIG. 4 showing a preferred arrangement of perforations 58 therein which are progressively larger downstream from the ozone inlet 59.

FIGS. 6 and 7 are top and end views respectively of the diffuser of FIGS. 4 and 5 showing preferred placement 0 of fins 61, 62 in relation to the placement P of perforations 63, 64 and 65 to provide even distribution of ozone emitting into the ozone contact zone and to create the gaseous barrier between the ozone contact zone and the acoustic contact zone as described under FIG. 2. Dimensions I, J, K, L, M, N, O and P are also preferably proportioned to enhance the resonant circuit described under FIG. 3.

DETAILS OF THE INVENTION

Figure 1:
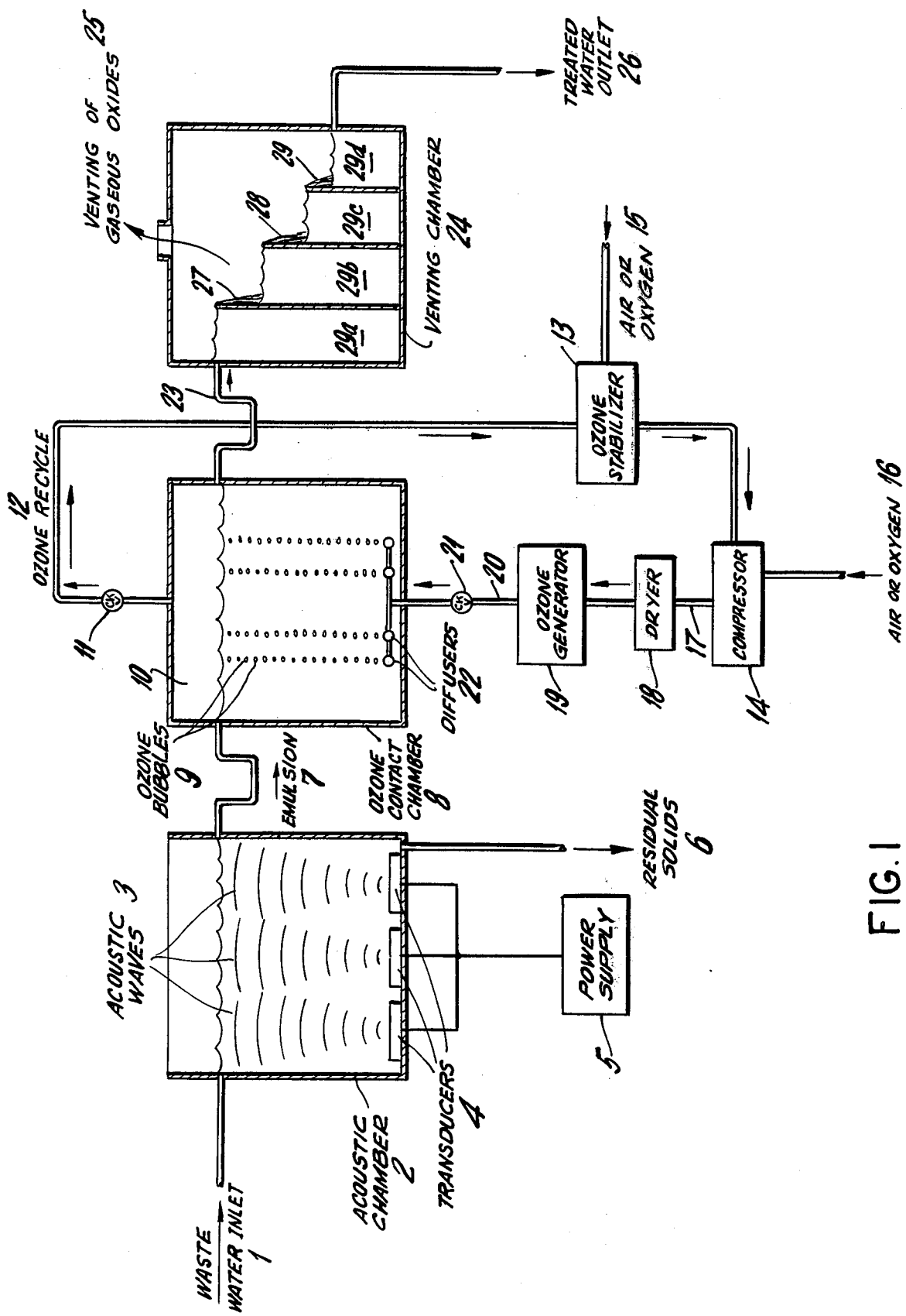
FIG. 1 is a schematic flow diagram showing how waste water 1 is cavitated and emulsified in acoustic chamber or zone 2 by acoustic waves or energy 3 from transducers 4. The emulsion thus obtained is ozonated in ozone contact chamber 8 to provide potable water 23 or 26.

Any type of industrial or domestic waste can be treated and purified by utilization of the process and apparatus of the present invention. Examples of such waste materials are polluted river water, raw sewage, secondary sewage, and industrial effluent. These materials normally comprise a high level of solids in aqueous solution. Preferably, the waste materials to be treated contain from about 1% to 50%, most preferably 5% to 30% solids, the particle size of said solids ranging from 2 microns to 4 inches, preferably from 4 microns to 2 inches.

The waste material which is to be treated in the present invention can be contaminated with many forms of microorganisms and bacteria including pathogenic bacteria and virus. The material can also be contaminated or polluted with such materials as sulphur, iron, manganese, lignite, tannin, phosphates, nitrates, acids, chlorine, cyanide, and common organic wastes such as synthetic detergent residues, fecal matter, and the like.

The microorganisms and contaminants just described are destroyed and effectively removed from waste materials by the invention process. The result obtained from the process is potable water which can be used directly or returned to the natural water table.

The waste purification process of the invention involves two basic steps. In a first step, acoustic energy sufficient to cavitate and emulsify the waste material is supplied. In a second step, the emulsion obtained in the first step is ozonated.

It has been discovered that ozone exerts an unexpected effect on waste materials which have been cavitated and emulsified by acoustic energy as described herein. Although ozone is a known oxidizing agent and disinfectant, it has not heretofore been deemed capable of achieving the results obtained with the present invention such as (1) actually clarifying waste materials by degrading the solids contained therein to innocuous gaseous oxides, and (2) effectively killing a broad spectrum of microorganisms and toxins found in waste materials, especially solids-containing materials. The unique and beneficial effect of ozone on waste materials obtained herein is directly related to the first step treatment of such materials which involves cavitating and emulsifying with acoustic energy.

With respect to the acoustic treatment step, any of the well-known transducers capable of generating the desired acoustic energy for cavitation and emulsification can be used. However, lead zirconate block transducers are highly preferred because of their inherent qualities of high acoustical energy transfer, i.e., 90% efficiency, and high Curie Point. Thus, with lead zirconate transducers, high power can be used with no transducer degradation.

Square wave acoustic energy rich in harmonic frequencies and having little side lobe suppression is preferred. Such wave properties enhance the desired cavitation and emulsification.

The power supplied to the transducers, and the other parameters of the acoustic treatment, can vary depending on the size and shape of the acoustic treatment zone and the waste load to be treated. Preferably, power of from 100 KVA to 10,000 KVA, most preferably 500 KVA to 1000 KVA, and most highly preferably about 500 KVA, is supplied at a mean frequency of 20 kc to 70 kc, most preferably about 28 kc, to lead zirconate transducers having a 20° to 60°, most preferably about a 30°, beam pattern to provide complete acoustic coverage of the acoustic chamber at a level of about 140 to 145 KBV.

As noted above, waste materials to be treated normally comprise solids in water. The solids have air or other gas bubbles trapped within. Acoustic energy in water, with sufficient power and frequency, penetrates through the solids — to the very core of the mass. Cavitation of the solids occurs in the acoustic treatment step of the process as the resonant frequency of the mass is reached. As this frequency is approached, the mass begins to vibrate, exciting the bubbles trapped within. Due to the excitation, the pressure within the bubbles builds up to approximately double its initial pressure and this pressure ultimately breaks the solids into smaller pieces. The broad band of acoustic frequencies then reaches the resonant frequencies of the smaller pieces and they begin to break up into even smaller pieces in the same manner. As this cavitation process continues, the smaller particles become emulsified with the solution. After emulsification has occurred, preferably substantially complete emulsification, the ozone can be added in order to conduct the ozone treatment step of the process.

The time of the acoustic treatment can vary with the number of transducers used, the level of power supplied thereto and the load being treated. Generally, however, the acoustic treatment step can be completed in from $\frac{1}{2}$ minute to 30 minutes, preferably from 1 minute to 15 minutes, dependent on static or flow conditions of the waste being treated.

High pressures tend to repress cavitation and therefore the acoustic treatment step is preferably conducted under a pressure corresponding to atmospheric pressure.

At the end of the acoustic treatment step, the solids surface level in the waste material has generally been reduced by 20% to 100%, preferably 40% to 90%, of its original value and the particle size of the solids remaining generally ranges from about 1 to 20 microns, preferably 1 to 5 microns. At this point, the waste material is in the form of a liquid, readily pumpable emulsion. The term "emulsion" is used herein in its ordinary dictionary sense to mean "a dispersion of fine particles or globules in liquid."

In the second basic step of the process, the emulsion obtained by the acoustic energy in the first step is ozonated by contacting it with ozone. Although any convenient method of contact is suitable, it is preferred to bubble the ozone through the emulsion. This can be done conveniently by diffusing the ozone into the lower extremity of a chamber containing the emulsion and then allowing the ozone to bubble up through the emulsion.

As is well known, ozone $O_3$ is an activated form of oxygen $O_2$. Ozone is a strong oxidizing agent. Ozone is also relatively unstable and decomposes to oxygen over a period of time.

Ozone for use in the ozone treatment step can be generated by any conventional means, the most convenient method being to pass dry oxygen or dry air through a corona discharge grid. Such ozone generators are commercially available. Ozone generators are not 100% efficient and thus there is always some oxygen or air emitting from an ozone generator. When pure oxygen is used as the feed to the generator, the output usually comprises about 3% – 8% ozone, the balance being oxygen. When air is used as the feed to the ozone generator, the output usually comprises about 1.75% – 5% ozone, the balance being oxygen and nitrogen.

In the ozone treatment step of the present invention, ozone can be diffused into the emulsion as a gas stream preferably comprising from 0.5% to 10%, most preferably 1% to 4%, ozone, the balance being oxygen and other gases.

As the ozone contacts the emulsion, it reacts with and oxidizes the contaminants therein and, at the same time, is itself reduced to oxygen and the oxides of the contaminants. The amount of ozone used depends on the amount of contaminants present in the emulsion. In order to achieve the best possible contact and results, it is preferable to bubble an excess of ozone through the emulsion.

It is preferred to carry out the ozonation at a pressure of about atmospheric or slightly higher in a closed chamber. Sufficient pressure should, however, be maintained on the ozone feed diffused into the emulsion to overcome the pressure head of the liquid emulsion. Accordingly, the pressure in the ozone input line, as well as in the rest of the system, can preferably be maintained within the range of from 1 psig to 30 psig, most preferably 3 psig to 10 psig.

The time of the ozonation step, i.e., the time period during which ozone is diffused into the emulsion, can vary widely depending on the type and quantity of waste material being teated and on the quantity of ozone input. Preferably, the time of ozonation is from $\frac{1}{2}$ minute to 30 minutes, most preferably from 3 minutes to 10 minutes, dependent on static or flow conditions of the emulsion being treated.

The excess or residual gas bubbling to the top of the emulsion which comprises ozone along with the oxygen formed by the ozonation reaction and the oxygen bubbled into the emulsion as part of the ozone feed stream, can if desired be released to the atmosphere. However, it is preferred not to so vent the residual ozone and oxygen, but instead to conduct the ozonation in a closed chamber and to collect the gas bubbling from the emulsion and recycle it. Recycling the ozone/oxygen has the advantages of (1) not releasing ozone to the atmosphere thus avoiding any toxic or combustionable dangers associated therewith, especially in an improperly ventilated environment, (2) preserving the amount of oxygen input needed for ozone production and ozonation with attendant cost savings, and (3) providing for enrichment of the ozone feed stream.

It is generally desirable to compress the recycling of the ozone/oxygen stream collected from the ozonation step in order to provide a continuing flow of gas in the system and to overcome the pressure head of the emulsion when diffusing the ozone feed stream into the emulsion. As is known in the art, compression of ozone tends to be dangerous because of the risk of explosion. Accordingly, a preferred embodiment of the present invention includes a unique step wherein the ozone recycle stream is stabilized prior to compression thereof. This stabilizing step preferably involves mixing the ozone stream with oxygen, in pure form or as air, in a vortex flow whereby the ozone is rapidly decomposed to oxygen and is thus stabilized.

The ozone recycle stream may also contain some moisture, for example, 70–80% relative humidity, carried from the waste emulsion and the stream is thus preferably dried prior to stabilization and prior to recycle to the ozone generator. The air or oxygen input to the ozone generator is also preferably dried prior to its use in the generator. Thus, the gas input to the emulsion preferably contains less than 5% relative humidity.

Subsequent to the ozonation step, the ozonated waste material can be agitated and vented to the atmosphere. The agitation, preferably with concurrent aeration, decomposes any residual ozone and releases the gaseous ozonation products of the original contaminants in parts per million with parts per hundred of oxygen.

The remaining purified solution has desirable odor and color, and is potable. At the end of the process, microorganisms and toxins have been totally destroyed or reduced to innocuous levels and the B.O.D. level in the material has been reduced by 80% – 100%, preferably 100%.

The acoustic treatment step and/or the ozonation step do not require high temperatures nor do they generate significant heat. Accordingly, the entire process can be conducted at ambient temperature. Thus, the temperature of the purified product is not significantly higher than the temperature of the waste material input so the process does not cause thermal pollution.

Further details of the invention and other embodiments thereof are set forth in the following discussion of the appended drawings.

With reference to FIG. 1, waste material input 1, for example, waste water such as sewage, is placed into acoustic treatment chamber 2. The waste material 1 is then subjected to acoustic energy 3, preferably ultrasonic square waves, from high efficiency transducers 4 powered by an oscillator power supply 5. The acoustic waves 3 create cavitation in the solids of the solution which consequently breaks down the solids into extremely fine particles and causes emulsification. That is, the fine particles are dispersed in the liquid. Irrespective of the type of input 1, the solids content therein is substantially reduced by cavitation and emulsification in the acoustical treatment step, and any remaining solids not emulsified can be separated from the chamber via line 6.

The resultant emulsion 7 from the acoustic treatment step is then transferred to an ozone contact chamber 8, which can comprise a closed vessel, and is subjected therein to ozonation by bubbling ozone 9 therethrough. Any residual ozone and/or oxygen which does not react with the waste material being ozonated collects at the top 10 of the ozone contact chamber and can be removed from the chamber through a check valve 11, for example, a float-type valve, which prevents liquid from leaving the confines of the contact chamber 8. The ozone/oxygen thus removed 12 is passed through an ozone stabilizer 13 wherein it is first dried and is then stabilized. Downstream from the stabilizer 13, the now stabilized residual ozone/oxygen stream is compressed 14. Make-up air or oxygen can be added to the system at the ozone stabilizer 15 and/or at the compressor 16 in an amount necessary to compensate for the ozone utilized in the ozonation reaction.

The compressed ozone stream 17 is then passed through a dryer 18, preferably a heatless dryer, and then through an ozone generator 19 wherein fresh ozone is generated, for example, by a corona discharge grid, so that the desired level of ozone can be maintained in the feed 20 to the ozone contact chamber 8. The feed stream 20 is routed through a check valve 21 and into the ozone contact chamber 8 via defusers 22 thus completing the ozonation cycle.

In a subsequent step, the ozonated but substantially ozone-free solution 23 is transferred to a venting chamber 24 wherein it is vented to the atmosphere so that the oxidation products of the ozonation reaction which are usually in the form of gaseous oxides can escape via vent 25 to the atmosphere leaving purified water 26 as a product. The venting chamber 24 can comprise a free-fall spill chamber wherein the free-fall of fluid 27, 28, 29 between sequentially lower compartments 29 a, b, c, d provides agitation and aeration. Any residual ozone in solution 23 is decomposed and vented as oxygen in chamber 24.

It is convenient to conduct the acoustic treatment step and the ozonation step within the same vessel or chamber. When this is done, care must be taken to separate the injection of the ozone stream into the chamber from the point where cavitation and emulsification of the waste material is to occur. Otherwise, the gaseous bubbles of ozone and oxygen will dampen the acoustic energy and tend to prevent the necessary cavitation of the waste solids.

Figure 2:
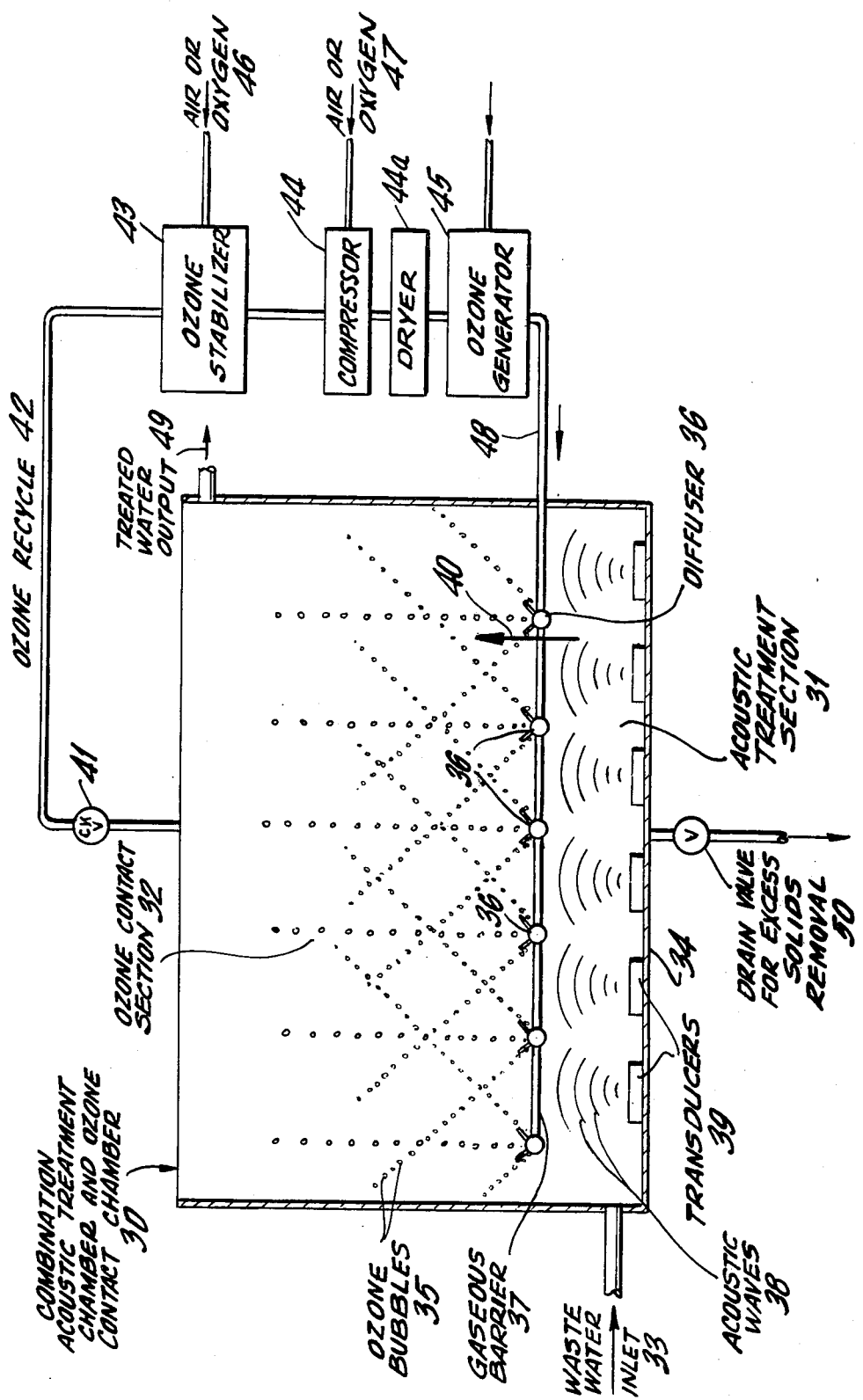
FIG. 2 is a schematic diagram illustrating a preferred embodiment of the invention wherein both the acoustical cavitation-emulsification step and the ozonation step are carried out within the same chamber 30. The chamber 30 is a combination acoustic treatment chamber and ozone contact chamber. Chamber 30 is effectively divided into an acoustic treatment zone 31 and an ozone contact zone 32 by a gaseous barrier 37 created by the upward flow of ozone bubbles 35 emitting from diffusers 36.

Accordingly, FIG. 2 shows an embodiment of the invention where the acoustic treatment step and the ozone contact step are carried out within the same chamber in a manner which provides separate sections for the acoustic treatment step and the ozone contact step and prevents the ozone bubbles from suppressing the necessary cavitation.

In FIG. 2, a combination acoustic treatment chamber and gaseous contact chamber 30 is shown which broadly comprises: a vessel 30 for holding liquids and gases; a divider 37 between the upper section 32 and the lower section 31 of the vessel 30 which permits liquids 40 to pass therebetween and which comprises a barrier to acoustic energy 38; means for imparting acoustic energy 39 into said lower section; and means for diffusing gas 36 into said upper section.

More specifically, a combination chamber 30 is provided with an acoustic treatment section 31 and an ozone contact section 32, said sections being divided by a barrier which permits the flow of liquid therebetween but is impervious to acoustic energy. When using the combination chamber 30, the waste material is injected at inlet 33 into the lower section of the chamber near the floor 34. Ozone bubbles 35 are admitted into the chamber by diffusers 36 having diffusion holes thereon aimed in a generally upward direction and arranged in a plane 37 covering an effective cross-sectional area of the chamber, for example, covering more than 90% of the cross sectional area. As the ozone input from line 48 is diffused into the chamber, a gaseous barrier is created at the plane 37 of the diffusers 36 which divides the chamber into an acoustic treatment section 31 and an ozone contact section 32. Acoustic waves 38 from transducers 39 cannot pass the gaseous barrier 37 and are thus reflected within the acoustic treatment section 31 wherein the cavitation and emulsification occurs. As the solution within the acoustic treatment section 31 becomes emulsified, it naturally passed up 40 into the ozone contact section 32 as the gaseous barrier permits liquids to pass therebetween.

The removal and recycle of residual ozone and oxygen via check valve 41 and line 42, through stabilizer 43, compressor 44, and dryer 44a, and ozone generator 45, with provisions for air or oxygen intake 46, 47 and back into diffusers 36 via line 48 can be the same as described above with reference to FIG. 1.

The purified water is removed from the upper section of the chamber 30 via treated water outlet valve 49 while excess solids not cavitated and emulsified can be drained by valve 50.

FIG. 3 shows a schematic sectional view of a preferred arrangement for a combination acoustic treatment chamber and ozone contact chamber 51 having a plurality of tube diffusers 52 therein, which diffusers are preferably finned 53. The floor 55 of the vessel 51 is lined with transducers 56.

In a preferred mode allowing for high efficiency operation, dimensions comprising the length of the diffusers A, the distance between the terminal diffuser 52 and the side of the vessel B, the distance between diffusers C, the distance between the diffusers and the floor of the vessel D, and the length of the vessel E, are proportioned so as to create a resonant circuit; that is, the finned tubes and the walls of the vessel are tuned to provide a resonant circuit. Although these dimensions can vary depending on the desired size of the vessel and the mean frequency of the acoustic energy, illustrative dimensions for a resonant circuit when a preferred mean frequency of 28 kc is used are:

A — 185 inches
B — 39 inches
C — 39 inches
D — 39 inches
E — 351 inches, and multiples thereof.

FIG. 4 is a pictorial view of a preferred tube-type diffuser 57 having fins 58, 59 thereon such as can be used in the apparatus of FIG. 3.

FIG. 5 shows a top view of the tube-type diffuser of FIG. 4. Preferably, the diffusion holes 58 are progressively enlarged downstream from the ozone inlet end 59 in order to insure an even distribution of ozone within the chamber and to create the gaseous barrier described hereinbefore. As an illustration, the holes can be 0.0135 inches in diameter along the first ⅓ section of the tube F, 0.028 inches in diameter along the second ⅓ section of the tube G, and 0.040 inches in diameter along the final ⅓ section of the tube H.

FIGS. 6 and 7 respectively show end and top views of a preferred diffuser 60 suitable for use in the apparatus of FIG. 3. The fins 61, 62 are so placed with respect to each other and to the diffusion holes 63, 64, 65 so as to provide uniform distribution of ozone into the chamber and to enhance the gaseous barrier and the resonant circuit described above.

Thus, where a preferred mean frequency of 28 kc is utilized, and dimensions A, B, C, D and E are as set forth hereinbefore, illustrative dimensions in FIG. 6 are:

I — 1.125 inches
J — 0.450 inches
K — 0.900 inches
L — 0.093 inches
M — 0.125 inches
N — 0.500 inches
O — 100°
P — 30°

When utilizing the preferred embodiments shown in FIGS. 3, 4, 5, 6 and 7, it is also preferred to utilize a pulse-power technique for the supply of acoustic energy. For example, square wave acoustic energy can be imparted to the acoustic treatment zone for 30 milliseconds, stopped for 60 milliseconds, imparted for 30 milliseconds and so on. With this technique, the original pulse of acoustic energy emitted from the transducers at the floor of the chamber strikes the gaseous barrier and creates a high standing wave ratio within the acoustic treatment chamber. The standing wave ratio is returned back toward the floor of the chamber, and strikes the floor midway between pulses.

When the power-pulse technique is used with a resonant circuit, a constant wave function results. This provides a highly efficient process. For example, for the same amount of power input to the transducers, the accoustical energy or wavefront imparted to the cavitating solids can be at least doubled.

As discussed hereinbefore, it is preferable when recycling the residual ozone stream to stabilize the ozone therein by mixing it with air or oxygen in a vortex flow.

Figure 8:
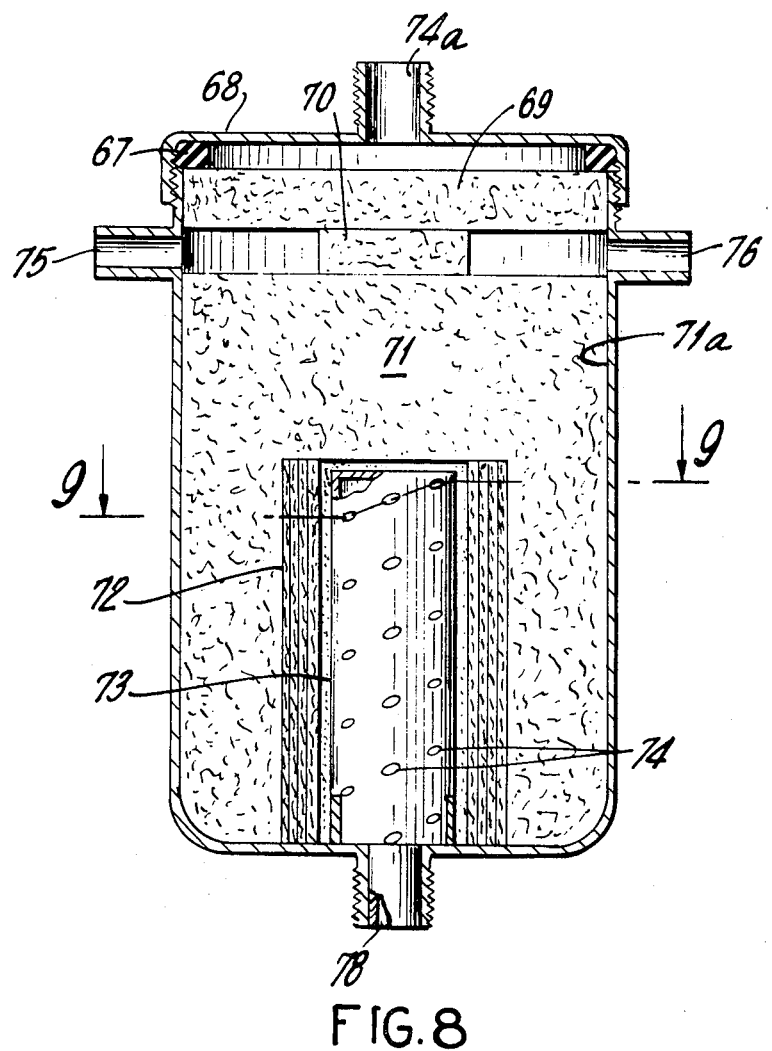
FIG. 8 shows a side view, taken at the centerline, of a preferred ozone stabilizer useful in the ozone recycle circuit shown in FIGS. 1 and 2. Positioned within the ozone stabilizer 68 are felt filters 69, 70, 71, a cellulose filter 72 and a swirl chamber 73 having a plurality of perforations 74 thereon arranged in a helical pattern.
Figure 9:
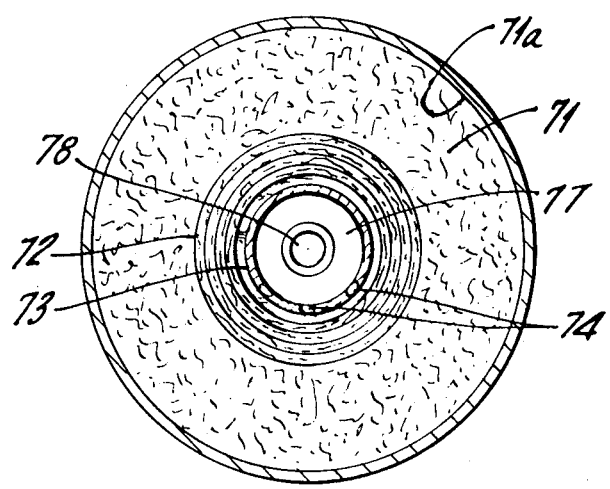
FIG. 9 is a top view of the ozone stabilizer of FIG. 8 taken at line 9—9.

FIGS. 8 and 9 respectively show side and top cross-sectional views of a preferred ozone stabilizer for use with the present invention.

Broadly speaking, the apparatus shown in FIGS. 8 and 9 is an ozone stabilizer which comprises a gas-tight vessel 71a, a swirl chamber 73 positioned within the interior of the vessel, a plurality of perforations 74 communicating between the interior of the vessel 71 and the interior 77 of the swirl chamber, means for passing a flow of ozone into the interior of the vessel upstream from the swirl chamber 74a, means for passing a flow of gas into the vessel upstream from the swirl chamber 75, 76, and means for passing a flow of gas from the vessel downstream from the swirl chamber 78. In this apparatus, the ozone and the other gas are mixed in the interior 77 of the swirl chamber in a vortex flow.

More specifically, and with further reference to FIGS. 8 and 9, the ozone stabilizing apparatus can comprise a gas-tight vessel 71a having a gasket 67 in communication with a removable top section 68. A brass or other suitable material swirl chamber 73, positioned within the interior of the vessel, is preferably cylindrical and perforated with a plurality of openings 74, preferably arranged in a helical pattern as illustrated. A flow of ozone-containing gas is passed into the interior of the stabilizer 71 at opening 74a upstream from the swirl chamber while a flow of air or oxygen is passed into the interior of the vessel via openings 75 and/or 76 upstream from the swirl chamber. Filters, which preferably comprise porous felt, can be positioned within the interior of the vessel 71 to remove any moisture present in the ozone and gas streams. As shown 69, 70, the filters can be positioned directly in the flow of the respective gas streams within the interior of the vessel 71. Any moisture not removed by the felt filters is removed by final filter 72 which preferably comprises cellulose fiber in continuous sheet form wrapped around the swirl chamber 73. The dried ozone and air or oxygen streams then pass through the perforations 74 which are preferably positioned at an angle of 45° relative to the axis and the radii of the swirl chamber and thence into the interior 77 of the swirl chamber 73 wherein a vortex flow is created as the gases pass downstream.

The rapid and violent agitation of the ozone with oxygen or air in the vortex flow quickly decomposes ozone to oxygen which is passed as a flow of gas from the vessel via opening 78 downstream from the swirl chamber. By means of this stabilizer, a moist ozone-containing flow of gas can be rapidly and dependably dried and decomposed to oxygen on a continuous basis. Periodically, the filters can be removed from the stabilizer and dried.

EXAMPLE

This example illustrates how the process and apparatus of the present invention can be used to treat and purify sewage into potable water.

Two and one-half gallons of effluent taken directly from the input holding tank of a municipal sewage treatment plant was used as the starting waste material in this example. The waste had a pH of 6.5, a pungent, nauseating odor, and had an opaque dark brown appearance. The waste was composed primarily of fecal matter and comprised approximately 10% total solids, ranging in particle size of from 4–5 microns up to ½ inch.

The waste solution just described was placed in an acoustic treatment chamber comprising a 1/16-inch stainless steel holding tank, having a seven gallon capacity (Model VST-42, 25 kHz, manufactured by Dri-Clave, Inc.). Eight lead zirconate transducers were spaced at equal intervals across the floor of the chamber.

An oscillator power supply (Model No. VSG-42, manufactured by Dri-Clave, Inc.) was connected to the transducers via an output tank circuit. The circuit was adjusted to reflect a saturation condition in the power amplifier tubes and the transducers thus produced a square wave having 400 watts of acoustic power at a mean frequency of 25 kHz, rich in harmonics and low in side lobe suppression.

The waste material in the chamber was subjected to the acoustic energy as described above for 30 minutes. As soon as the acoustic energy was supplied, the solids in the waste solution began to cavitate and break apart. As cavitation continued and the particle size of the solids became smaller and smaller, emulsification occurred. At the end of the thirty minute period, the solution was substantially completely emulsified and contained less than 5% undissolved solids; all of the solids remaining had a particle size of less than about 5 microns. The emulsion was in a liquid state and readily pourable.

Two liters of the emulsion thus formed were pumped from the acoustic treatment chamber into an ozone contact chamber.

The ozone contact chamber was cylindrical, 36 inches high with a 3 inch inside diameter. This chamber was fabricated from a transparent inert plastic ("lucite") and was capped at the top and bottom. The top capping was fitted with a line for residual ozone removal which had a float-type check valve therein to prevent moisture from leaving the ozone contact chamber. Four porous air stone diffusers were fitted at the bottom of the chamber and connected through a bottom fitting to an ozone inlet line.

Ozone was generated by passing dry oxygen through a corona discharge ozone generator of 10,000 volts at 250 watts and having an output capacity of 1.5 pounds of ozone per 24 hour day.

The ozone was fed through the ozone inlet line via a check valve to the porous air stone diffusers. The ozone concentration in the feed to the diffusers was approximately 3%, the balance of gas in the feed was comprised in large part of oxygen. The pressure in the feed line and in the ozone contact chamber was about 3 psig.

The gas which collected at the top of the ozone contact chamber comprised residual ozone and oxygen. This residual gas was removed from the ozone contact chamber via the float-type check valve and recycled through an ozone stabilizer wherein it was dried and stabilized by decomposing it to oxygen by mixing with oxygen in a vortex flow. The stabilizer comprised a gas-tight vessel containing felt and cellulose filters, and a brass swirl chamber perforated in a helical pattern with holes drilled 45° to the axis and radii, as described above with respect to FIGS. 8 and 9.

The stabilized, i.e., ozone-free, recycle stream emitting from the stabilizer was passed, along with dry make-up oxygen, through an oiless-type air compressor capable of supplying a flow of about 30 SCFH at 3 to 5 psig. The stream was then passed through a heatless dryer and thence into the ozone generator.

A flow rate of ozone through the ozone contact chamber of 1.5 pounds per 24-hour day was continued for a period of 10 minutes; about 4.7 grams of ozone was used during this time.

As the bubbles of ozone passed up through the emulsion, foaming occurred due to the oxidation of contaminants contained therein. During the 10-minute ozone contact period, the emulsion dramatically changed from opaque dark brown to a translucent amber solution.

At the end of the 10-minute ozone contact period, the solution, which contained about ½ ppm dissolved ozone, was pumped into a venting chamber.

The venting chamber was constructed of a clear, inert plastic ("lucite") box, 12 inches square and divided into four compartments of unequal height. The box was so constructed that the inlet flowed first into the highest compartment and then into each successively lower compartment.

The free fall of the solution between compartments provided agitation and aeration whereby the residual dissolved ozone was decomposed to oxygen and this oxygen, along with the gaseous oxidation products comprising gaseous oxides of the original contaminants, was vented to the atmosphere. The gases so vented comprised less than about 4–5 ppm with 100 pph of oxygen when vented into free air.

The purified liquid remaining was odorless and potable.

The data shown in Table I were generated prior to and after the process described above in this example.

TABLE I

| Item | Waste Effluent Prior To Treatment | Purified Liquid After Treatment |
|---|---|---|
| Odor | Pungent, nauseating | Odorless, neutral |
| Color | Opaque Dark Brown | Clear light amber |
| pH | 6.5 | 6.5 |
| Plate Count (total bacteria) | 13,400 ppm/ml | 133 ppm/ml |
| Nitrates | 250 ppm (est.) | less than 10 ppm |
| Solids | 10% (4–5 microns to ½ inch) | 1–2% (1–5 microns) |
| Temperature | 25° C. | 25° C. |

Although certain embodiments of the invention have been described in detail herein, it will be appreciated that other embodiments are contemplated along with modifications of the disclosed features and steps, as being within the scope of the invention. For example, although the process embodiments of the invention have been described as a batch or step-wise operation, it will be readily apparent to those skilled in the art that the process can be carried out in a continuous manner. Likewise, although the invention has been described utilizing tank-type vessels, the use of tube-type or pipe-line reactor vessels is also contemplated.

What is claimed is:

1. A process for combined acoustic treatment and ozonation of liquid waste material, comprising the steps of, placing the waste material in a vessel,
providing the vessel with diffusers that emit gaseous bubbles thereinto, said diffuser causing said bubbles to cover at least 90 percent of the cross-sectional area of the vessel so as to divide the vessel by a gaseous barrier into a generally lower acoustic treatment section with a generally upper ozone contact section,
initially placing said waste material into the acoustic treatment section, imparting acoustic energy to said material in said section at an energy level sufficient to cavitate and to emulsify said waste material,
transferring said cavitated liquid to said ozone contact section, and diffusing a gas stream containing 0.5 to 10% ozone into said ozone contact section.

2. A process as in claim 1, wherein said vessel is open to the atmosphere and said acoustic treatment and ozone contact sections are at atmospheric pressure.

3. A process as in claim 1, wherein said vessel is closed and said acoustic treatment and ozone contact sections are approximately at atmospheric pressure or slightly higher.

4. A process according to claim 3, wherein said cavitation emulsifies said waste material.

5. A process as in claim 3, wherein said diffusers have apertures therein, and said ozone containing gas is emitted from said apertures.

6. A process according to claim 3, wherein said acoustic energy is confined to said gaseous barrier and said lower level.

7. A process according to claim 6, wherein said vessel is open to the atmosphere and said upper and lower levels are at atmospheric pressure.

8. A process according to claim 6, wherein said vessel is closed and said diffusers project the gaseous bubbles in a generally upward direction.

9. A process according to claim 1, wherein said diffusers have apertures therein and said ozone containing gas is emitted from said apertures.

10. A process according to claim 9, wherein said ozone is bubbled through said upper level in a substantially uniform concentration thereacross.

11. A process according to claim 1, wherein the acoustic energy is produced as acoustic radiation with square wave shape.

12. A process according to claim 11, wherein the acoustic radiation with square wave shape is rich in harmonic oscillations and has little side lobe suppression.

13. A process according to claim 12, wherein the acoustic wave radiation is generated by a plurality of lead zirconate block transducers.

14. A process according to claim 13, wherein the power supplied to the transducers is between 500 and 1,000 kva with a frequency of 20 to 70 kc.

15. A process according to claim 1, wherein the acoustic treatment section for the waste water acts as a resonant circuit.

16. A process according to claim 1, which includes the steps of creating an emulsion of the waste material by the cavitation thereof, which emulsion is transferred to the ozone contact section so that during ozone contact, ozone in finely divided form is blown into the ozone contact section containing the emulsion so that it bubbles through the emulsion.

17. A process according to claim 1, wherein the waste material which is ozonated in the second process step is agitated and vented in a final step.

18. A process according to claim 17, wherein the ozonated waste material is passed through a free-fall spill chamber in order to agitate and vent it.

* * * * *